United States Patent [19]
Lindström et al.

[11] Patent Number: 5,995,616
[45] Date of Patent: Nov. 30, 1999

[54] APPARATUS FOR COMMUNICATION BETWEEN A TELEPHONE EXCHANGE AND CONNECTED TELEPHONE SETS

[75] Inventors: Anders Olof Lindström, Vällingby; Anna Kristina Boström, Solna; Hans Magnus Broberg, Hägersten, all of Sweden

[73] Assignee: Telefonaktiebolget LM Ericsson, Stockholm, Sweden

[21] Appl. No.: 08/780,331

[22] Filed: Jan. 8, 1997

Related U.S. Application Data

[63] Continuation-in-part of application No. 08/182,820, Jan. 19, 1994, abandoned.

[30] Foreign Application Priority Data

Jan. 20, 1993 [SE] Sweden .................................. 9300155

[51] Int. Cl.$^6$ .................................................. H04M 9/00
[52] U.S. Cl. ........................... 379/290; 379/399; 370/431
[58] Field of Search .................................... 379/225, 232, 379/258, 268, 270, 272, 290, 339, 344, 350, 353, 399; 370/314, 330, 436, 431

[56] References Cited

U.S. PATENT DOCUMENTS

| | | | |
|---|---|---|---|
| 4,325,147 | 4/1982 | Rothlauf | 370/91 |
| 4,455,646 | 6/1984 | Bloodworth | 370/66 |
| 4,627,047 | 12/1986 | Pitroda et al. | 370/58 |
| 4,771,418 | 9/1988 | Narasinmhan et al. | 370/58 |
| 4,984,266 | 1/1991 | Smith | 379/399 |
| 5,222,130 | 6/1993 | Pflueger et al. | 379/399 |
| 5,283,827 | 2/1994 | Conforti et al. | 379/399 |
| 5,323,460 | 6/1994 | Warner et al. | 379/399 |

*Primary Examiner*—Scott Weaver
*Attorney, Agent, or Firm*—Burns, Doane, Swecker & Mathis, L.L.P.

[57] ABSTRACT

In the connection of a number of telephone sets to a private branch exchange, control information is communicated between the telephone sets and the exchange set in such a way that a bidirected conversion unit is required. In order to provide a high degree of service at a reasonable cost the telephone sets are collected in groups which share a generally smaller number of conversion units. By way of suitable control devices and switch units in the forwarding of control information, a suitable non-occupied conversion unit can be selected.

21 Claims, 2 Drawing Sheets

APPARATUS FOR COMMUNICATION BETWEEN A TELEPHONE EXCHANGE AND CONNECTED TELEPHONE SETS

This application is a continuation-in-part of U.S. application Ser. No. 08/182,820 filed Jan. 19, 1994, now abandoned. This application also claims priority from Swedish Patent Application No. 9300155-0 that is dated Jan. 20, 1993 and that is expressly incorporated herein by reference.

BACKGROUND

The present invention relates to communication between a telephone exchange, typically a private branch exchange, and telephone sets connected thereto.

In private branch exchanges, where communication between the exchange and the telephone sets connected thereto is performed in a digital way and by means of Serial communication, serial control information, which is sent, e.g., from a telephone set to the telephone exchange, must be converted to another suitable form, e.g., paraellel form, in order to be able to be processed by control circuits associated with the exchange and in certain cases the control logic of the telephone exchange itself. Also, the corresponding control information, which is issued from the telephone exchange, must be converted from the internal digital format of the exchange to serial signals on the line near the telephone sets connected to the exchange. Therefore, for each telephone set coupled to the exchange and its connecting line a line circuit is arranged performing conversion of the signals to a format suitable to the receiver. Such conversion circuits have been known for a long time as conventional construction elements and they perform conversion from digital signals in parallel form to digital signals forwarded in a serial form and the opposite.

The provision of a conversion unit for each telephone line may be rather costly, in particular considered from the viewpoint that each conversion unit in many cases is not used very often. An alternative solution to the conversion problem is then that a number of telephone sets share one common conversion unit. This solution can, however, result in problems, when several telephone sets in a group are to use, at the same time, the common conversion unit.

Prior conversion systems are described in U.S. Pat. No. 4,726,054; No. 4,325,147; No. 4,630,232; and No. 4,365,293.

SUMMARY

It is an object of the invention to provide a telephone network and exchange having a reduced number of conversion units and still giving a high degree of service.

According to the invention a telephone exchange and a telephone exchange network are provided having an enhanced capacity and an improved flexibility in the communication with the individual telephone sets coupled to the telephone exchange.

Instead of arranging a number of telephone lines to share a common conversion unit, a number of telephone lines share a common conversion unit as in the alternative solution mentioned above, a number of telephone sets are arranged to share a number of conversion units, the number of conversion units thus being greater than one. If in a prior telephone exchange layout one conversion unit were arranged for four telephone lines, instead, e.g., four conversion units can be arranged for a group of 16 telephone lines. The assignment of a conversion unit for a message or a digital signal sequence issued from or to be forwarded to a telephone set is performed by means of specific control means and switches or multiplexers/demutiplexers controlled by the control means. By means of such an arrangement a high degree of service can be provided or communication with the individual telephone sets at a reasonable cost.

In particular, there is in a telephone network a telephone exchange having a number of telephone sets coupled to the exchange. A first kind of information, such as the control information mentioned above, has such a form that for its communication between the exchange and/or control logic arranged in or at the exchange and the telephone sets a conversion unit is required. A number of telephone sets are coupled to the exchange unit through a common line board and they are thus collected in a group. On each such line board, for a group, there are several conversion units of the kind mentioned above. The number of such conversion units can preferably be smaller than the number of telephone sets in the group and is always greater than one. Control means on the line board control switch units which are connected between the conversion unit and the exchange unit itself and between the conversion units and the telephone sets in the group, such that when the mentioned information of the first kind must be converted, it is assigned a signal path through a suitable, not occupied conversion unit.

The communication to and from the telephone sets is preferably performed only serially at the lines near the telephone sets and then certain serial signals sequences represent the mentioned first information or control information and other signal sequences acoustic information, which is forwarded between the telephone set and the exchange and also other "user information" such as information sent from and to a data modem connected at a telephone set.

BRIEF DESCRIPTION OF THE DRAWINGS

The invention will now be described by way of an exemplary embodiment, given only for illustrating the invention, with reference to the accompanying drawings, in which.

DETAILED DESCRIPTION

Figure 1:
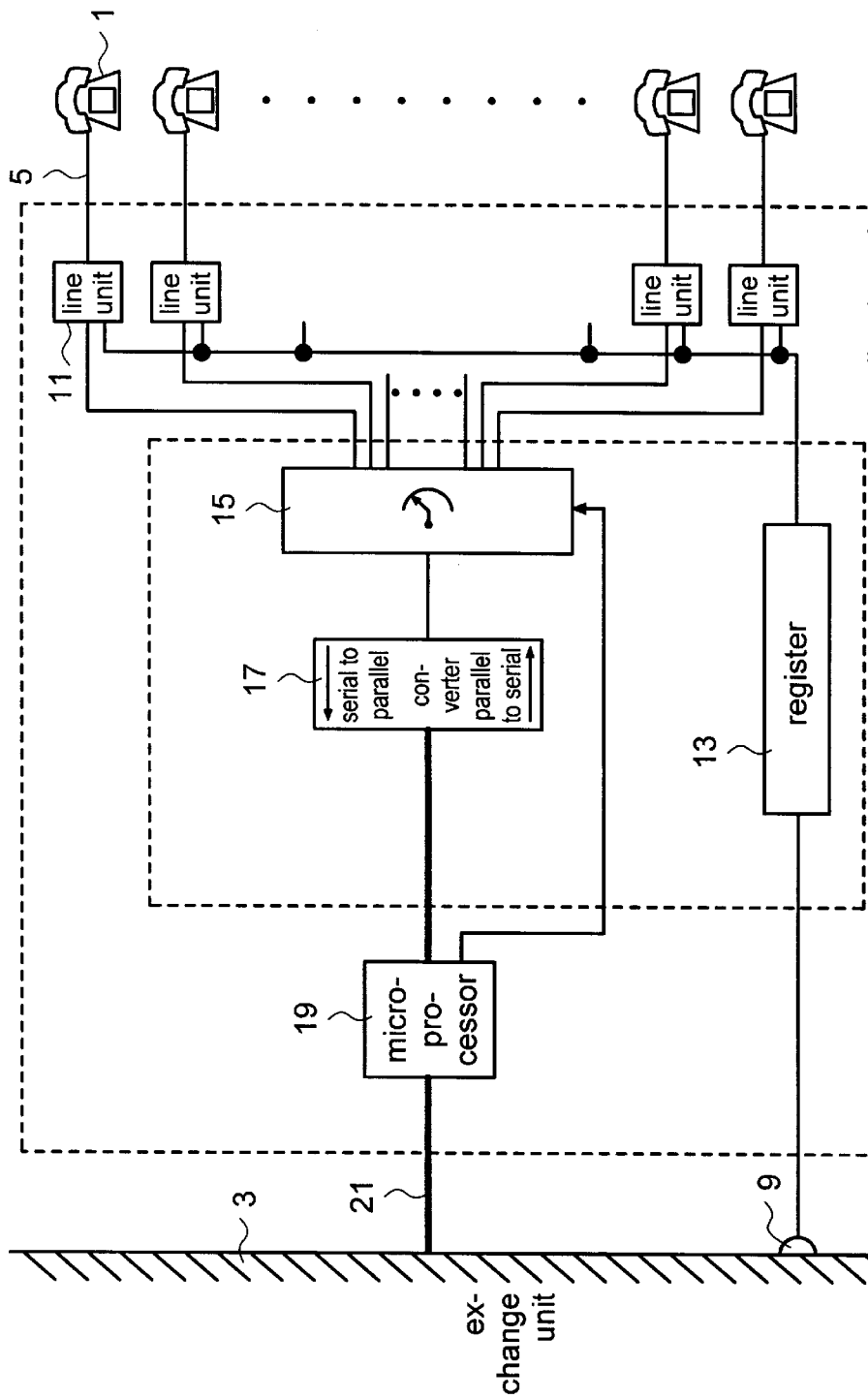
FIG. 1 is a block diagram of the communication between a telephone exchange and the telephone sets connected thereto according to prior art.

A prior art system for connecting telephone sets digitally to an exchange is illustrated in FIG. 1. A number of telephone sets 1 are thus connected to an exchange unit 3 such as a private branch exchange or PBX. The communication of all signals and messages between the telephone set 1 and the central exchange unit 3 is performed digitally. Thus, acoustic information like a spoken message in a microphone belonging to a telephone set 1 in some way is converted to digital form, e.g., by means of pulse code modulation PCM. In the corresponding way a suitable digital signal sequence, which is forwarded through the exchange 3 and was originally received from a telephone set 1, is converted to an acoustic message and is transferred to the loudspeaker associated with another telephone set 1. This information is also forwarded basically serially to and from the telephone sets 1 and exchange 3.

Also digital information, which originates from or is received by a user through for instance a telephone modem (not shown) connected at a telephone set 1, is forwarded serially from and to the telephone set.

In addition to such information which a user wishes to transfer, i.e., send or receive, between the telephone sets 1 and the exchange unit 3 also other signal or control information is communicated. Typical of such information is a signal sent from a telephone set, by a person dialling a connection number when it is to establish communication with another telephone set, which is, e.g., also connected to the exchange unit 3. In addition the exchange 3 can in the conventional way be connected to the public telephone network (not shown).

From the individual telephone sets 1 lines 5, which allow bidirectional communication, lead to a line board or line card 7, which is connected to the exchange unit 3 and in the conventional way is mounted in a socket (not shown) provided therefor in the exchange. The lineboard 7 performs the signal processing which is necessary in order to separate the different kinds of forwarded digital information and to convert this information to suitable electric representations. Inside the exchange unit 3 then the various digital messages are communicated, which represent acoustic messages and other use messages, between ports 9 of the exchange unit 3.

The line board 7 comprises a line unit 11 for each connected telephone set 1 with its associated connection line 5. In the line unit 1 the digital information representing different kinds of control information is separated from the digital information representing acoustic messages and other user information, in the digital signal stream originating from the telephone set. The signal stream is in the conventional way of the serial type. The serial information representing a small portion of an acoustic message or of another user information, is transferred to a register 13 for an intermediate storing therein, before this portion is forwarded to the port 9 of the exchange unit 3 to be transferred to another port or possibly the same port of the exchange unit 3. All line units 11 on the line board 7 are connected to the same register 13. Suitable functions are arranged here to keep an account of the various signal sequences originating from different telephone sets 1, e.g., by arranging that predetermined, periodically repeated time slots are assigned to each telephone set.

The line units 11 transfer the serial information corresponding to control signals originating from a telephone set through a multiplexor/demultiplexor 15 to a combined serial-to-parallel and parallel-to-serial converter 17 controlled by a micro processor 19. The serial digital signal sequence received by the bidirected converter 17 is converted therein to a parallel form and is fetched from the converter 17 by the microprocessor 19. The microprocessor 19 processes the received information. If this information contains, e.g., a request of establishing a connection to another connecting point, the microprocessor 19 forwards a message thereof to the exchange unit 3 on a connection line 21 of the exchange. In the opposite case the microprocessor 19 sends control information to a telephone set 1 through the bidirected converter 15 converting the information to a serial form. By controlling the multiplexor/demultiplexor 15 appropriately, the serial information is then forwarded to the correct line unit 11, which is connected to the desired telephone set 1.

Figure 2:
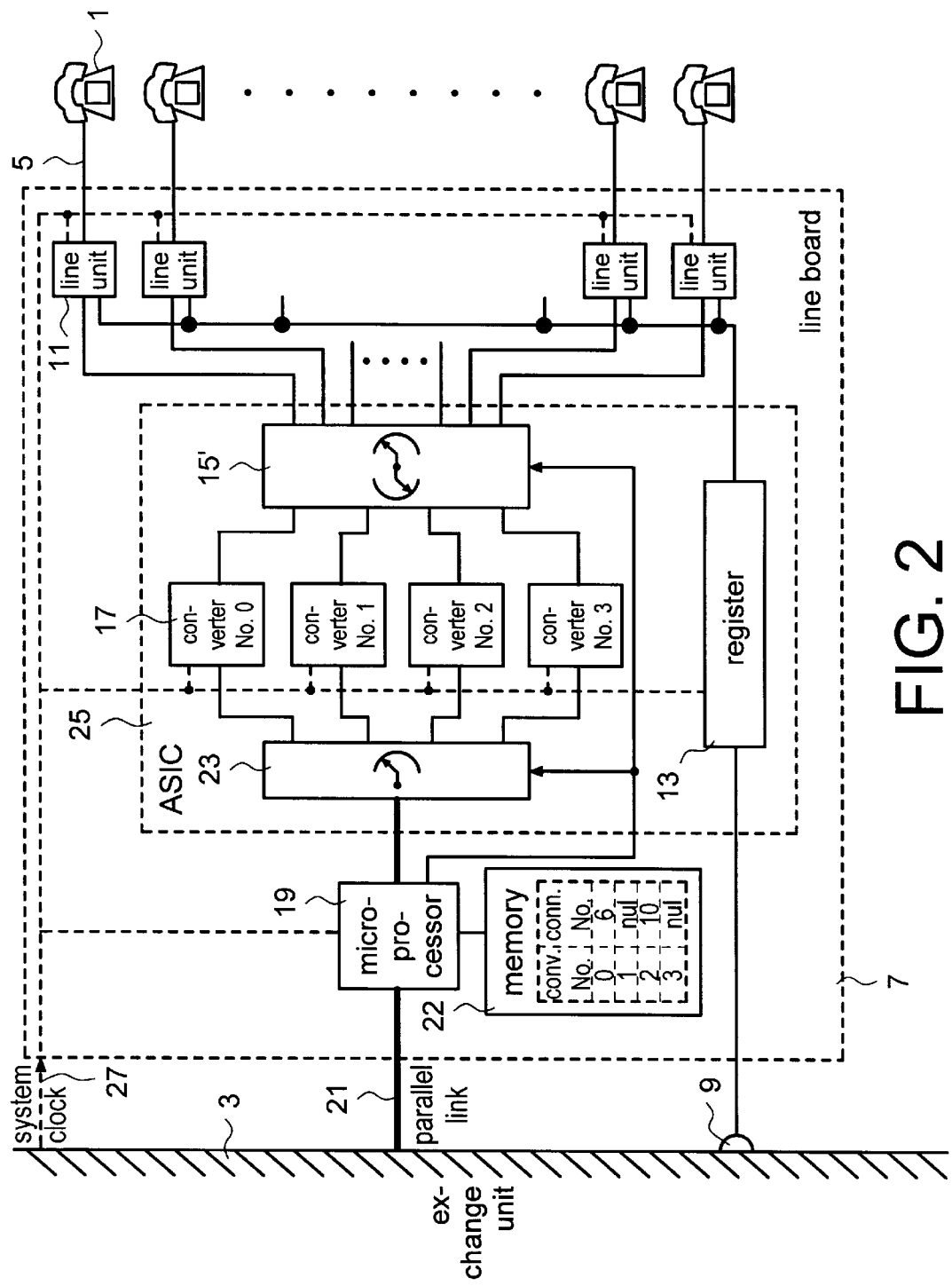
FIG. 2 is a block diagram of the communication between a telephone exchange and the telephone sets connected thereto having enhanced conversion capabilities.

In the system of FIG. 1, all telephone sets 1 connected to the same line board 7 use the same converter 15, which can be very impractical when each line board is used for a large number of extensions. Instead of using a shared common conversion unit, the telephone sets 1 connected to the same board 7 can be arranged to share a number of conversion units and a system using this design is illustrated in FIG. 2.

Here a plurality of converters 17 are provided, working in parallel with each other. Only a small number of such bidirected converters 17 are arranged, i.e., the number thereof is generally a small part of the total number of connected telephone sets 1. A practical example may be that 16 different telephone sets 1 are connected to one line board 7 and that the line board 7 contains four bidirected converters 17. The multiplexor/demultiplexor or switch unit 15' is modified to provide switching from any one of the telephone line units 11 to each one of the converters 17 and from any of the converters 17 to each one of the line units 11. A serial digital control signal sequence from a telephone set is routed to a non-occupied or non-busy bidirected converter 17 as controlled by the processor 19, the processor issuing a suitable control signal to the switch unit 15'. For that purpose the processor 19 uses a table stored in a memory 22. The table has a marking for each converter 17 signifying whether it is non-busy, "null", or a figure denoting the line unit 11 or its associated telephone set 1 which presently uses this converter 17.

The serial signal sequence, in the selected converter 17 is converted to a parallel form and is fetched from the converter 17 through a second multiplexer/demultiplexer or switch unit 23 by the microprocessor 19. The second switch unit 23 allows switching between any of the converters 17 and the microprocessor 19. The microprocessor 19 processes the received information. If this information contains, e.g., a request of establishing a connection to another connection point, the microprocessor 19 forwards a message thereof to the exchange unit 3 on the connection line 21 to the exchange.

Several of the components on the line board 7, e.g., the two switches 15', 23, the bidirected converters 19, and the register 13, can suitably be constructed as a signal integrated circuit 25.

In the opposite case, when the microprocessor 19 is to send control information to a telephone set 1, the microprocessor 19, by means of a control line to the second switch 23, selects a signal path to a non-occupied bidirected converter 17. In it the information from the microprocessor 19 is converted to a serial form and is then forwarded through the first switch 15', controlled by a signal on a control line from the microprocessor 19, to the correct line unit 11, which is connected to the desired telephone set 1.

If a connected telephone set 1 is to be given a particularly high priority, this telephone set 1 can be more or less permanently assigned its own bidirected converter 17. Thereby it is ensured that control messages to and from this telephone set always can be processed rapidly by the line board 7.

For controlling the various components a system clock signal is provided on a line 27 from the exchange 3. The clock signal is delivered to an intermediate register 13, the processor 19, the converters 17, and the line units 11. It controls the timing of the digital bits forwarded and the start of frames used for the transmission of information between the line units, the register 13, the exchange 3, and the start of time slots present in each frame, each slot, e.g., being used by a predetermined one of the line units 11.

What is claimed is:

1. A telephone network comprising:
   an exchange;
   a plurality of telephone sets for connection to the exchange and for sending and receiving information in a first form to and from the exchange;

a plurality of means for converting information in the first form into information in a second form usable by the exchange;

a first switch unit connected between the plurality of converting means and the exchange;

a second switch unit connected between the plurality of converting means and the plurality of telephone sets; and means for controlling the first and second switch units in order to assign a signal path between a telephone set, of the plurality of telephone sets, and the exchange through an unoccupied converting means.

2. The telephone network of claim 1, wherein the plurality of converting means is fewer in number than the plurality of telephone sets.

3. The telephone network of claim 1, wherein the plurality of telephone sets serially communicate digital information, the information in the first form is serial data, the information in the second form is parallel data, and the converting means include means for converting digital data from serial form to parallel form and from parallel form to serial form.

4. The telephone network of claim 1, wherein each telephone set, of the plurality of telephone sets, is connected to the second switch unit through a line unit, and the line unit taps information in the first form from signals sent from each telephone set and also enters information in the first form into signals sent to each telephone set.

5. The telephone network of claim 4, wherein the signals sent from and to each telephone set include signals representing acoustic messages.

6. The telephone network of claim 4, wherein the signals sent from and to each telephone set include signals representing digital information for communication between users.

7. The telephone network of claim 1, wherein the plurality of means for converting are identical, each converting means serving each of the plurality of telephone sets.

8. In a telephone exchange having a plurality of telephone sets for connection thereto that are each arranged for forwarding information in a first form between the telephone set and the exchange, a conversion apparatus comprising:

a plurality of conversion units;

a first switch unit connected between the plurality of conversion units and the exchange;

a second switch unit connected between the plurality of conversion units and the plurality of telephone sets; and means for controlling the first and second switch units and for assigning, to information in the first form that is to be forwarded, a signal path between a telephone set, of the plurality telephone sets, and the telephone exchange through an unoccupied conversion unit.

9. The conversion apparatus of claim 8, wherein the plurality of conversion units is fewer in number than the plurality of telephone sets.

10. The conversion apparatus of claim 8, wherein the plurality of telephone sets are arranged to forward digital information serially, the information in the first form is serial data, and the conversion units include means for converting digital data from serial form to parallel form and from parallel from to serial form.

11. The conversion apparatus of claim 8, wherein each telephone set, of the plurality of telephone sets, is connected to the second switch unit through a line unit that taps information in the first form from signals sent from a telephone set and enters information in the first form into signals sent to a telephone set.

12. The conversion apparatus of claim 11, wherein the signals sent from and to each telephone set include signals representing acoustic messages.

13. The conversion apparatus of claim 11, wherein the signals sent from and to each telephone set include signals representing digital information for communication between users.

14. A telephone network according to claim 4, wherein the signals that are sent from and to a telephone set include information originating from a telephone modem.

15. The conversion apparatus of claim 8, wherein the plurality of conversion units are identical, each conversion unit serving each of the plurality of telephone sets.

16. A telephone network comprising a number of telephone sets connected to an exchange, a first kind of information being sent between one of the number of telephone sets and the exchange in such a form that a conversion unit is required, wherein:

the telephone sets are collected in groups;

for each group there is a number of conversion units, this number being greater than one;

a switch unit is connected between the number of conversion units and the exchange and a switch unit between the number of conversion units and a group of telephone sets associated with the number of conversion units; and control means are arranged for controlling the switch units in order to assign to information of the first kind, which is to be forwarded, a signal path between a telephone set and the exchange through a conversion unit that is not already occupied.

17. A telephone network according to claim 16, wherein the plurality of telephone sets are arranged to communicate information of a digital kind by serial communication, the first kind of information is in serial form, and the conversion units comprise converters for converting digital data from serial to parallel form and from parallel to serial form.

18. A telephone network according to claim 16, wherein each telephone set is connected to a switch unit through a line unit that taps information of the first kind from the signals that are sent from that telephone set, and also enters information of the first kind in signals that are sent to that telephone set.

19. A telephone network according to claim 18, wherein the signals that are sent from the telephone set include signals that represent acoustic messages.

20. A telephone network according to claim 18, wherein the signals that are sent from and to a telephone set include signals representing digital information for communication between users.

21. A telephone network according to claim 16, wherein the conversion units are identical, each conversion unit serving each of the telephone sets in a group.

* * * * *